United States Patent
Mattavelli

(10) Patent No.: US 11,034,195 B2
(45) Date of Patent: Jun. 15, 2021

(54) ROTARY FEEDTHROUGH ASSEMBLY FOR A TIRE INFLATION SYSTEM

(71) Applicant: DANA ITALIA S.R.L., Arco (IT)

(72) Inventor: Dino Mattavelli, Arco (IT)

(73) Assignee: DANA ITALIA S.R.L., Arco (IT)

( * ) Notice: Subject to any disclaimer, the term of this patent is extended or adjusted under 35 U.S.C. 154(b) by 372 days.

(21) Appl. No.: 15/999,326

(22) PCT Filed: Feb. 17, 2017

(86) PCT No.: PCT/EP2017/053679
§ 371 (c)(1),
(2) Date: Aug. 17, 2018

(87) PCT Pub. No.: WO2017/140882
PCT Pub. Date: Aug. 24, 2017

(65) Prior Publication Data
US 2019/0039423 A1 Feb. 7, 2019

(30) Foreign Application Priority Data

Feb. 19, 2016 (EP) ..................................... 16425015

(51) Int. Cl.
*B60C 23/00* (2006.01)
(52) U.S. Cl.
CPC ...... *B60C 23/003* (2013.01); *B60C 23/00318* (2020.05); *B60C 23/00345* (2020.05)
(58) Field of Classification Search
CPC ............ B60C 23/003; B60C 23/00305; B60C 23/0318; B60C 23/00345; B60C 23/00381
See application file for complete search history.

(56) References Cited

U.S. PATENT DOCUMENTS

| | | | |
|---|---|---|---|
| 6,199,611 B1 * | 3/2001 | Wernick | B60C 23/003 152/417 |
| 6,668,888 B1 * | 12/2003 | Beesley | B60C 23/003 152/415 |

(Continued)

FOREIGN PATENT DOCUMENTS

| | | |
|---|---|---|
| CN | 102785537 A | 11/2012 |
| CN | 104245368 A | 12/2014 |

(Continued)

OTHER PUBLICATIONS

China National Intellectual Property Administration, Search Report Issued in Application No. 201780010400.2, dated Dec. 22, 2019, 3 pages.

(Continued)

*Primary Examiner* — Jason R Bellinger
(74) *Attorney, Agent, or Firm* — McCoy Russell LLP

(57) ABSTRACT

A rotary feedthrough assembly for a tire inflation system for a vehicle. The assembly may have a stationary part including a first section of a main fluid line and a first section of a pilot fluid line. A rotatable part may be rotatably mounted on the stationary part support a pneumatic tire. The rotatable part may have a second section of the main fluid line and a second section of the pilot fluid line. A first annular seal chamber may be radially disposed between the stationary part and the rotatable part. The first annular seal chamber may provide fluid communication between the first section of the main fluid line and the second section of the main fluid line. A second annular seal chamber may be radially disposed between the stationary part and the rotatable part. The second annular seal chamber may provide fluid communication between the first section of the pilot fluid line and the second section of the pilot fluid line.

14 Claims, 2 Drawing Sheets

(56) References Cited

U.S. PATENT DOCUMENTS

| | | | |
|---|---|---|---|
| 8,052,400 B2* | 11/2011 | Isono | F04B 35/00 |
| | | | 417/233 |
| 9,162,539 B2 | 10/2015 | Hibbler et al. | |
| 9,499,015 B2* | 11/2016 | Bittlingmaier | B60B 27/0047 |
| 2008/0314487 A1 | 12/2008 | Walter | |
| 2013/0112327 A1 | 5/2013 | Tigges | |
| 2017/0210184 A1* | 7/2017 | Bonora | F16J 15/34 |
| 2020/0062047 A1* | 2/2020 | Bonora | B60C 23/003 |

FOREIGN PATENT DOCUMENTS

| | | |
|---|---|---|
| CN | 2014196602 U | 3/2015 |
| DE | 102005006073 | 8/2006 |
| EP | 0071278 A2 | 2/1983 |
| EP | 1095799 | 5/2001 |
| EP | 2072290 | 6/2009 |
| EP | 2586630 | 5/2013 |
| EP | 2653323 | 10/2013 |
| WO | 2013156430 | 10/2013 |

OTHER PUBLICATIONS

European Patent Office, International Search Report with Written Opinion issued in PCT/EP2017/053679, dated Feb. 17, 2017, 10 pages, European Patent Office, Rijswijk, Netherlands.

\* cited by examiner

ROTARY FEEDTHROUGH ASSEMBLY FOR A TIRE INFLATION SYSTEM

BACKGROUND OF THE INVENTION

The invention relates to a rotary feedthrough assembly for a tire inflation system, in particular for an automotive vehicle.

Tire inflation systems are used in different types of vehicles such as trucks, tractors or earth-moving machines. The main objective of a tire inflation system is to adapt the tire pressure to different operating conditions. Typically, these conditions include at least on of the ground the vehicle is travelling on, a vehicle speed and a vehicle load. The contact patch of a tire is influenced by the tire pressure. As the tire pressure is decreased the contact patch increases. As the tire pressure is increased the contact patch decreases. For this reason, it is desirable to optimize the tire pressure depending on ground conditions. For example, a lower tire pressure may be adopted when the vehicle is traveling on soft surfaces such as gravel. On the other hand, a higher tire pressure may be chosen when the vehicle is traveling on hard surfaces such as tarmac or concrete. Hence, a tire inflation system may improve the longevity of the tire, reduce soil compaction, lower fuel consumption, and reduce over-all operating costs.

Since it is desirable that the tire can be inflated and deflated during operation of the vehicle, tire inflation systems known from the prior art comprise rotary seal arrangements. These may be disposed between a vehicle spindle and a wheel hub on which the wheel and the tire may be mounted, for example. Generally, the functioning of rotary seal arrangements is critical for the tire inflation system because the rotary seal arrangement should preferably be configured to transmit fluid used for inflating the tire from a pneumatic line to a wheel valve while the vehicle wheel is rotating. Typically, rotary seal arrangements include sealing means disposed on a spindle and/or on a wheel hub, the sealing means usually being in sliding contact when the wheel is rotating. In this way, the sealing means form an annular seal chamber through which fluid can be transported from a fluid source such as a compressor to the rotating tire and vice versa.

WO 2013/156430 A1 describes a spindle assembly for a tire inflation system in which some of the fluid lines are integrated in the vehicle axle. However, this solution may require the design of the rotatable part, for example a wheel hub, to be adapted to the design of the spindle, for example. In some cases this may imply that deep bores have to be drilled in the axle which may possibly complicate the manufacturing process. When the assembly includes more than one fluid line, for example a main line for filling and draining the tire and a pilot line for actuating a pneumatically actuatable control valve, its spatial extension, in particular its axial extension, may have to be enlarged in order to accommodate all sealings and fluid lines. This is often undesirable because for many applications the length of the axle including the tire inflation system is required to be below a given maximum length.

BRIEF SUMMARY OF THE INVENTION

It is therefore an object of the present invention to design a preferably compact rotary feedthrough assembly for a tire inflation system which may be manufactured and assembled in a preferably simple manner.

The presently proposed rotary feedthrough assembly for a tire inflation system, in particular for an automotive vehicle, comprises at least:

- a stationary part comprising a first section of a main fluid line and a first section of a pilot fluid line;
- a rotatable part rotatably mounted on the stationary part and configured to support a pneumatic tire, the rotatable part comprising a second section of the main fluid line and a second section of the pilot fluid line;
- a first annular seal chamber radially disposed between the stationary part and the rotatable part, the first annular seal chamber providing fluid communication between the first section of the main fluid line and the second section of the main fluid line;
- a second annular seal chamber radially disposed between the stationary part and the rotatable part, the second annular seal chamber providing fluid communication between the first section of the pilot fluid line and the second section of the pilot fluid line. The stationary part may be a steering knuckle or another type of wheel supporting stationary member. The rotatable part may be a wheel hub or another rotatable member, for example.

The presently proposed rotary feedthrough assembly differs from known assemblies in that the first annular seal chamber and the second annular seal chamber are located on radially opposing sides of the rotatable part. This design facilitates a particularly compact arrangement of the first and the second annular seal chamber, in particular along an direction defined by the axis of rotation of the rotatable part. Furthermore, the proposed assembly allows the design of the rotary seal chambers to be separated from the design of the rotatable part. As compared to the solution disclosed in WO 2013/156430 A1, the main fluid line may have an extended width because the lines may be moved from the vehicle axle to mechanical components which may carry a smaller weight which may moreover facilitate manufacture. Within the scope of this document, the term fluid preferably refers to a gaseous medium such as air.

In particular, the first annular seal chamber and the second annular seal chamber may be arranged at different radial distances from the axis of rotation of the rotatable part. For example, the first annular seal chamber and the second annular seal chamber may be arranged such that they partially overlap along the axial direction. This allows the axial extension of the feedthrough assembly to be reduced.

Typically, the assembly further comprises a valve which may be mounted on the rotatable part, for example. The valve may then be configured to selectively provide fluid communication between the second section of the main fluid line and a pneumatic tire which may be mounted on the rotatable part. The valve may further be configured to be actuated by a fluid pressure applicable to the valve through the pilot fluid line. For example, the valve may be configured such that a fluid pressure in the pilot fluid line above or below a threshold pressure causes the valve to open so that the tire pressure may be increased or decreased.

The first annular seal chamber may be located radially on an outer side of the rotatable part, the outer side of the rotatable part facing away from the axis of rotation of the rotatable part, and the second annular seal chamber may be located radially on an inner side of the rotatable part, the inner side of the rotatable part facing the axis of rotation of the rotatable part.

Alternatively, the second annular seal chamber may be located radially on the outer side of the rotatable part, the outer side of the rotatable part facing away from the axis of rotation of the rotatable part, and the first annular seal chamber may be located radially on the inner side of the rotatable part, the inner side of the rotatable part facing the axis of rotation of the rotatable part.

The stationary part may comprise a first portion on which the rotatable part is mounted and may further comprise an annular-shaped second portion. The first portion and the second portion of the stationary part may be integrally formed. The first portion and the second portion of the stationary part may be arranged concentrically with respect to each other. The first portion and the second portion of the stationary part may enclose an axially extending annular-shaped recess. The annular-shaped recess may have an opening which faces the rotatable part.

The rotatable part may comprise an annular-shaped, axially extending protrusion. The protrusion may at least partially extend into the recess formed by the stationary part or the protrusion may be at least partially received in the recess formed by the stationary part. One of the annular seal chambers, for example the first annular seal chamber, may be located radially on an outer side of the protrusion, the outer side of the protrusion facing away from the axis of rotation of the rotatable part. In this case the second section of the main fluid line typically extends at least partially within the protrusion of the rotatable part.

The assembly may further comprise an annular seal disposed between the rotatable part and the second portion of the stationary part, thereby preventing contaminants from entering the recess formed by the stationary part.

The first annular seal chamber or the second annular seal chamber may be located radially on an inner side of the annular-shaped second portion of the stationary part.

The first annular seal chamber may comprise or may be formed or at least partially formed by a pair of annular sealing lips. The annular sealing of the first annular seal chamber may be mounted on the stationary part, for example on the inner side of the second annular-shaped portion of the stationary part.

Analogously, the second annular seal chamber may comprise or may be formed or at least partially formed by a pair of annular sealing lips. The annular sealing lips of the second annular seal chamber may mounted on the rotatable part, for example on the inner side of the rotatable part, wherein the inner side of the rotatable part faces the axis of rotation of the rotatable part.

The assembly may further comprise a pair of bearings disposed radially between the stationary part and the rotatable part. Typically, the bearings are mounted on the first portion of the stationary part. In other words, the rotatable part may be rotatably mounted on the stationary part, in particular on the first portion of the stationary part, by means of the bearings. The bearings may be configured as roller bearings or ball bearings, for example. The bearings may be axially spaced with respect to one another. One of the annular seal chambers, for example the second annular seal chamber, may be disposed axially between the bearings. In particular, the bearings and the above-described protrusion of the rotatable part may be arranged such that at least one of the bearings supports the protrusion of the rotatable part.

BRIEF DESCRIPTION OF THE DRAWINGS

An embodiment of the invention will now be described by way of example with reference to the accompanying drawings in which FIG. 1 a sectional view of a rotary feedthrough assembly, wherein a first section and a second section of a pilot fluid line are in fluid communication through an annular seal chamber arranged between a steering knuckle and a face of a wheel hub facing the axis of rotation of the wheel hub.

DETAILED DESCRIPTION OF THE INVENTION

Figure 1:
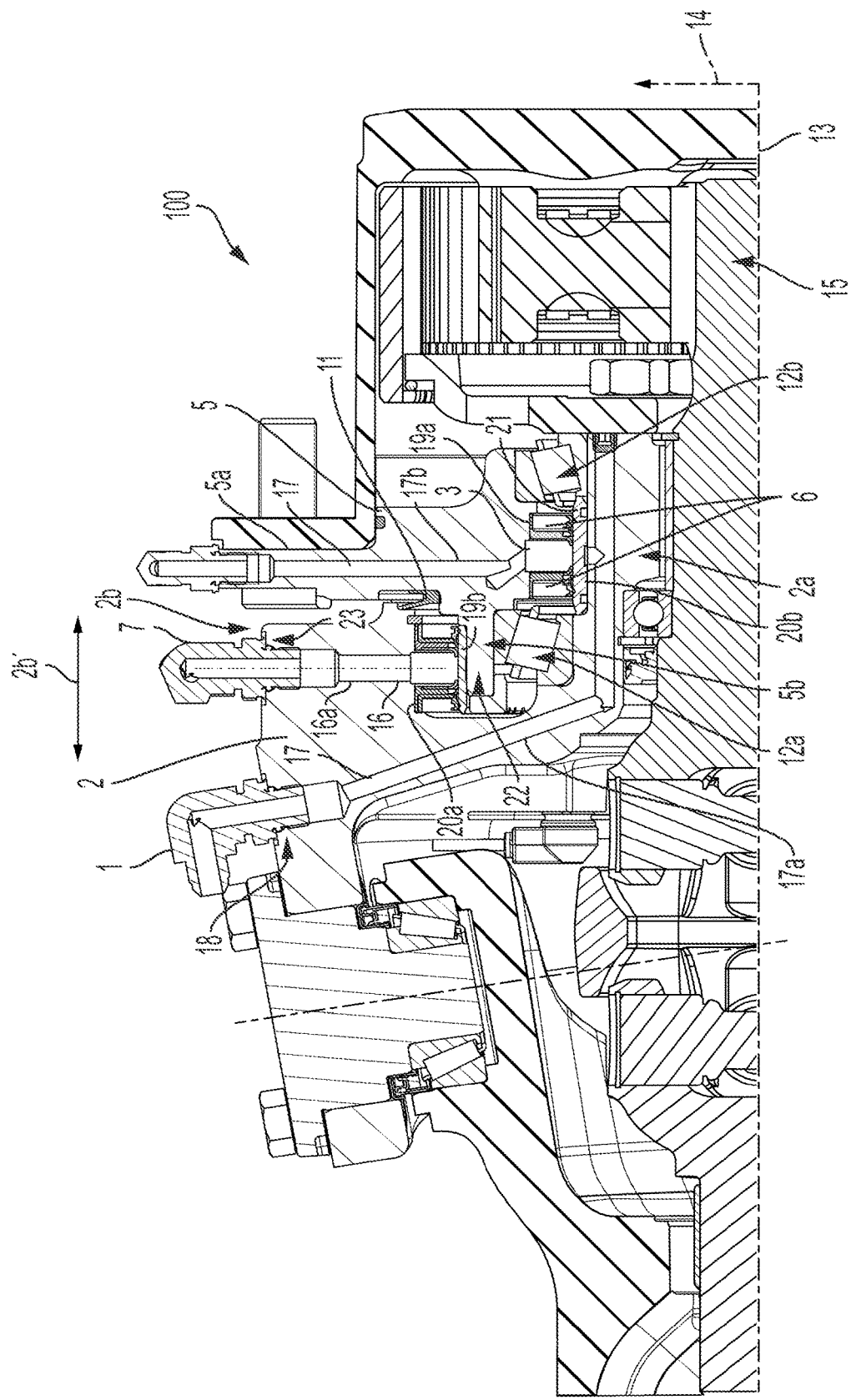

FIG. 1 illustrates a sectional view of a rotary feedthrough assembly 100 for a tire inflation system of an automotive vehicle, for example of an off-highway vehicle such as a tractor or a material handling vehicle. The assembly 100 comprises a stationary part 2, for example a steering knuckle, and a rotatable part 5, for example a wheel hub. The rotatable part 5 is rotatably mounted on the stationary part 2 by means of a pair of pair of roller bearings 12a, 12b. An axis of rotation 13 of the rotatable part 5 defines an axial direction. A radial direction 14 runs perpendicular to the axial direction 13. The stationary part 2 is non-rotatable with respect to the axial direction 13. Both the stationary part 2 and the rotatable part 5 are arranged concentrically with respect to the axis of rotation 13 of the rotatable part 5.

The stationary part 2 includes a first section 16a of a main fluid line 16 and a first section 17a of a pilot fluid line 17. Both the first section 16a of the main fluid line 16 and the first section 17a of the pilot fluid line 17 are integrated in the stationary part 2. The first section 16a of the main fluid line 16 is in fluid communication with a fluid source such as a compressor (not shown) through a fitting 7 screwed into a bore 23 in the stationary part 2. The first section 17a of the pilot fluid line 17 is in fluid communication with the same fluid source or with another fluid source through a fitting 1 screwed into a bore 18 in the stationary part 2. Both the first section 16a of the main fluid line 16 and the first section 17a of the pilot fluid line 17 are integrated in the stationary part 2.

Figure 2:
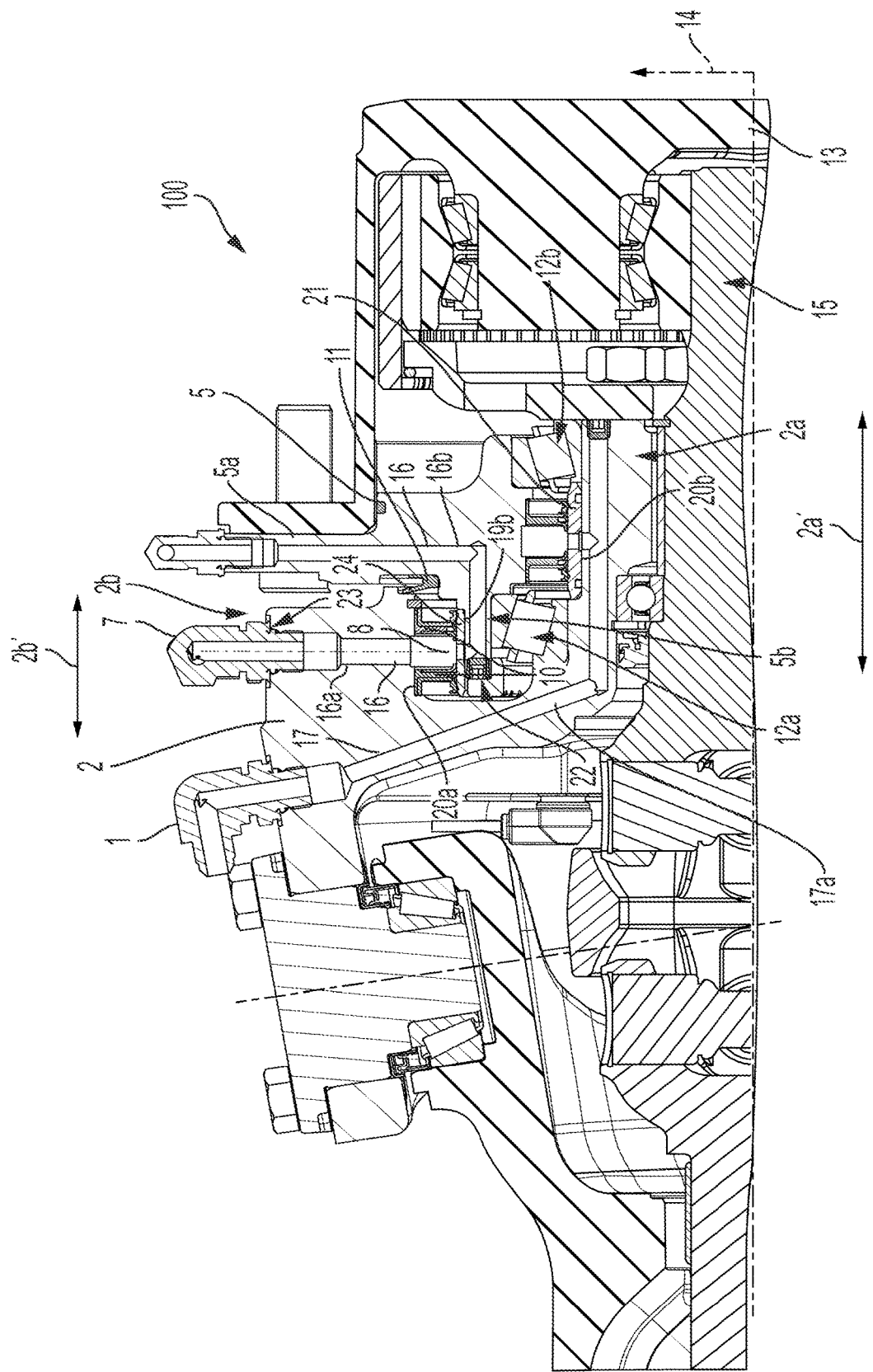
FIG. 2 another sectional view of the rotary feedthrough assembly of FIG. 1, wherein a first section and a second section of a main fluid line are in fluid communication through an annular seal chamber arranged between a steering knuckle and a face of the wheel hub facing away from the axis of rotation of the wheel hub.

The rotatable part 5 includes a second section 16b (FIG. 2) of the main fluid line 16 and a second section 17b of the pilot fluid line 17. In FIG. 1 and FIG. 2 recurring features are designated with the same reference signs. In FIGS. 1 and 2 the rotatable part 5 is arranged at a different angles of rotation with respect to the stationary part 2. Both the second section 16b (FIG. 2) of the main fluid line 16 and the second section 17b of the pilot fluid line 17 are integrated in the rotatable part 5. Both the second section 16b (FIG. 2) of the main fluid line 16 and the second section 17b of the pilot fluid line 17 are in fluid communication with a pneumatically actuatable control valve which may be mounted on the rotatable part 5 (not shown). The valve provides selective fluid communication between the main fluid line 16 and a pneumatic tire (not shown) which is mounted on and supported by the rotatable part 5. That is, through the main fluid line 16 the tire may inflated or deflated. The control valve may be selectively opened or closed by applying a high fluid pressure or a low fluid pressure on an actuator through the pilot fluid line 17.

The first section 16a and the second section 16b of the main fluid line 16 are in fluid communication with each other through a first annular seal chamber 8 (FIG. 2). The first annular seal chamber 8 is radially disposed between the stationary part 2 and the rotatable part 5. Similarly, the first section 17a and the second section 17b of the pilot fluid line 17 are in fluid communication with each other through a second annular seal chamber 3 (FIG. 1). The second annular seal chamber 3 is likewise radially disposed between the stationary part 2 and the rotatable part 5.

In an alternative embodiment not explicitly depicted here, the fluid lines 16 and 17 may exchange their roles as main fluid line and pilot fluid line, so that the fluid line 17 functions as the main fluid line and the fluid line 16 functions as the pilot fluid line. That is, in this alternative embodiment the pneumatic tire may be inflated and deflated via the fluid line 17 and the control valve, and, in the same alternative embodiment, the control valve may be selectively opened or closed by applying a high fluid pressure or a low fluid pressure on an actuator through the fluid line 16.

The stationary part 2 is made of metal and has cylindrical symmetry or essentially cylindrical symmetry with respect to the axis of rotation 13. The stationary part includes a first portion 2a and a second portion 2b. An axial extension of the first portion 2a is indicated at 2a' and an axial extension of the second portion 2b is indicated at 2b'. The first portion 2a and the second portion 2b are integrally formed with the stationary part 2. The second portion 2b has an annular shape. In the embodiment depicted in FIGS. 1 and 2 the first portion 2a, too, has an annular shape, a spindle 15 being received in a center bore or center clearance of the first portion 2a. The first portion 2a and the second portion 2b are arranged concentrically with respect to the axis of rotation 13 of the rotatable part 5. An inner radius of the annular-shaped second portion 2b is larger that an outer radius of the first portion 2a. The first portion 2a and the second portion 2b are at least partially overlapping along the axial direction 13. Along the radial direction 14 the first portion 2a and the second portion 2b enclose a recess 22 which is open towards the rotatable part 5.

The rotatable part 5 has an essentially disc-shaped main body 5a and an annular-shaped protrusion 5b extending from the main body 5a toward the stationary part 2 along the axial direction 13. The rotatable part 5 is made of metal. Both the main body 5a and the protrusion 5b are arranged concentrically with respect to the axis of rotation 13 of the rotatable part 5. The main body 5a and the protrusion 5b are integrally formed. The protrusion 5b is at least partially extending into the recess 22 which is radially disposed between the first portion 2a and the second portion 2b of the stationary part. In other words, the protrusion 5b is at least partially received in the recess 22 formed between the first portion 2a and the second portion 2b of the stationary part. Furthermore, the protrusion 5b and the inner roller bearing 12a (i.e. the roller bearing 12a disposed axially between the second annular seal chamber 3 and the stationary part 2) are arranged such that the inner roller bearing 12a supports the protrusion 5b.

The second annular seal chamber 3 is located radially between an inner face 19a of the main body 5a of the rotatable part 5 and an outer face 20b of the first portion 2a of the stationary part 2. The inner face 19a of the main body 5a of the rotatable part is facing the axis of rotation 13 of the rotatable part 5. The outer face 20b of the first portion 2a of the stationary part 2 is facing away from the axis of rotation 13 of the rotatable part 5. Axially, the second annular seal chamber 3 is disposed between the roller bearings 12a, 12b. The second annular seal chamber 3 is formed by a pair of rubber sealing lips 6 (FIG. 1) which are mounted on the inner face 19a of the main body 5a of the rotatable part 5. The sealing lips 6 comprise airtight PTFE sealing lips facing the second annular seal chamber and conventional sealing lips facing the bearings 12a, 12b, respectively, for sealing the second annular seal chamber 3 from lubricants used for lubricating the bearings 12a, 12b. The second annular seal chamber 3 is further formed by a metal bushing 21 disposed on the outer face 20b of the first portion 2a of the stationary part 2. When the rotatable part 5 and the sealing lips 6 mounted on the inner face 19a of the rotatable part 5 are rotating with respect to the axis 13, the sealing lips 6 are in sliding sealing contact with the bushing 21. Thus, the second annular seal chamber 3 prevents fluid leakage when fluid is led from the first section 17a of the pilot line 17 to the second section 17b of the pilot line 17 or vice versa.

The first annular seal chamber 8 is located radially between an inner face 20a of the second portion 2b of the stationary part 2 and an outer face 19b of the axially extending protrusion 5b of the rotatable part 5. The inner face 20a of the second portion 2b of the stationary part 2 is facing the axis of rotation 13 of the rotatable part 5. The outer face 19b of the axially extending protrusion 5b of the rotatable part 5 is facing away from the axis of rotation 13 of the rotatable part 5. Like the second annular seal chamber 3, the first annular seal chamber 8 is formed by a pair of rubber sealing lips 10 (FIG. 2) which are mounted on the inner face 20a of the annular-shaped second portion 2a of the stationary part 2. The first annular seal chamber 8 is further formed by a metal bushing 24 disposed on the outer face 19b of the protrusion 5b of the rotatable part 5. When the rotatable part 5 is rotating with respect to the axis 13, the sealing lips 10 of the first annular seal chamber 8 are in sliding sealing contact with the bushing 24. Thus, the first annular seal chamber 8 prevents fluid leakage when fluid is led from the first section 16a of the main fluid line 16 to the second section 16b of the main fluid line 16 or vice versa. The second section 16b of the main fluid line extends at least partially through and is at least partially integrated in the protrusion 5b of the rotatable part 5.

An annular sealing 11 which is disposed between the rotatable part 5 and the second portion 2b of the stationary part 5 additionally protects the first annular seal chamber 8 from contamination. In particular, the sealing 11 is disposed radially between an outer face of the protrusion 5b and an inner face of the second portion 2b of the stationary part 2.

The first annular seal chamber 8 and the second annular seal chamber 3 are arranged at different radial differences from the axis of rotation 13 of the rotatable part 5. The inner roller bearing 12a, the axially extending protrusion 5b or the rotatable part 5 and the first annular seal chamber 8 are all received or at least partially received in the recess 22 formed between the first portion 2a and the second portion 2b of the stationary part. In other words, at least the inner roller bearing 12a and the first annular seal chamber are stacked along the radial direction 14. That is, the fact that the first annular seal chamber 8 and the second annular seal chamber 3 are located on radially opposing sides of the rotatable part gives rise to a particularly compact arrangement of the assembly 100 as a whole. For example, compared to the design depicted in FIG. 2 of WO 2013/156430 A1 where both annular seal chambers are arranged next to one another along the axial direction, the presently proposed assembly has a significantly decreased extension along the axial direction 14.

The invention claimed is:

1. A rotary feedthrough assembly for a tire inflation system for a vehicle, the assembly comprising:
 a stationary part comprising a first section of a main fluid line and a first section of a pilot fluid line;
 a rotatable part rotatably mounted on the stationary part and configured to support a pneumatic tire, the rotatable part comprising a second section of the main fluid line and a second section of the pilot fluid line;

a first annular seal chamber radially disposed between the stationary part and the rotatable part, the first annular seal chamber providing fluid communication between the first section of the main fluid line and the second section of the main fluid line;

a second annular seal chamber radially disposed between the stationary part and the rotatable part, the second annular seal chamber providing fluid communication between the first section of the pilot fluid line and the second section of the pilot fluid line;

wherein the first annular seal chamber and the second annular seal chamber are located on radially opposing sides of the rotatable part.

2. The rotary feedthrough assembly according to claim 1, further comprising a valve mounted on the rotatable part, the valve configured to selectively provide fluid communication between the second section of the main fluid line and the pneumatic tire mountable on the rotatable part, and the valve configured to be actuated by a fluid pressure applicable to the valve through the pilot fluid line.

3. The rotary feedthrough assembly according to claim 1, wherein the first annular seal chamber and the second annular seal chamber are arranged at different radial distances from the axis of rotation of the rotatable part.

4. The rotary feedthrough assembly according to claim 3, wherein
   a. the first annular seal chamber is located radially on an outer side of the rotatable part, the outer side of the rotatable part facing away from the axis of rotation of the rotatable part, and wherein the second annular seal chamber is located radially on an inner side of the rotatable part, the inner side of the rotatable part facing the axis of rotation of the rotatable part; or
   b. the second annular seal chamber is located radially on the outer side of the rotatable part, the outer side of the rotatable part facing away from the axis of rotation of the rotatable part, and wherein the first annular seal chamber is located radially on the inner side of the rotatable part, the inner side of the rotatable part facing the axis of rotation of the rotatable part.

5. The rotary feedthrough assembly according to claim 1, wherein the stationary part comprises a first portion on which the rotatable part is mounted, and an annular-shaped second portion, wherein the first portion and the second portion of the stationary part are arranged concentrically with respect to each other and enclose an axially extending annular-shaped recess, wherein an opening of the annular-shaped recess faces the rotatable part.

6. The rotary feedthrough assembly according to claim 5, wherein the rotatable part comprises an annular-shaped, axially extending protrusion which is at least partially received in the recess formed by the stationary part, and wherein the first annular seal chamber is located radially on an outer side of the protrusion.

7. The rotary feedthrough assembly according to claim 6, further comprising an annular seal disposed between the rotatable part and the second portion of the stationary part, thereby preventing contaminants from entering the recess formed by the stationary part.

8. The rotary feedthrough assembly according to claim 7, wherein the first annular seal chamber or the second annular seal chamber is located radially on an inner side of the annular-shaped second portion of the stationary part.

9. The rotary feedthrough assembly according to claim 6, further comprising a pair of bearings disposed radially between the stationary part and the rotatable part, wherein the bearings are axially spaced with respect to one another and wherein the second annular seal chamber is disposed axially between the bearings.

10. The rotary feedthrough assembly according to claim 9, wherein the bearings are disposed on the first portion of the stationary part.

11. The rotary feedthrough assembly according to claim 10, wherein the protrusion of the rotatable part is supported by one of the bearings.

12. The rotary feedthrough assembly according to claim 1, wherein the first annular seal chamber is formed by a pair of annular sealing lips, wherein the annular sealing lips forming the first annular seal chamber are mounted on the stationary part.

13. The rotary feedthrough assembly according to claim 1, wherein the second annular seal chamber is formed by a pair of annular sealing lips, wherein the annular sealing lips forming the second annular seal chamber are mounted on the rotatable part.

14. The rotary feedthrough assembly according to claim 6, wherein the second section of the main fluid line extends at least partially through the protrusion.

* * * * *